United States Patent

[11] 3,601,632

[72] Inventor Larry Vane W. Frazier
 Ventura, Calif.
[21] Appl. No. 864,081
[22] Filed Oct. 6, 1969
[45] Patented Aug. 24, 1971
[73] Assignee The United States of America as represented by the Secretary of the Navy

[54] MEANS FOR INCREASING THE RELIABILITY OF ELECTRONIC CIRCUITS INCORPORATING ZENER DIODES
 1 Claim, 4 Drawing Figs.

[52] U.S. Cl. ................................... 307/219,
 307/202, 307/318
[51] Int. Cl. .................................... G06f 11/08
[50] Field of Search ........................... 307/204,
 219, 318, 202

[56] References Cited
 UNITED STATES PATENTS
 2,906,941 9/1959 Brolin ........................... 307/218
 3,069,562 12/1962 Steele ........................... 307/204
 3,211,917 10/1965 Ervin ............................ 307/318

OTHER REFERENCES
 Electronics Vol. 36, No. 15, April 12, 1963 " Basic Rules for Designing Reliability into Semiconductor Circuits" by Hall; pp. 62, 63 (copy enclosed)

*Primary Examiner*—John S. Heyman
*Attorneys*—Richard S. Sciascia, Q. Baxter Warner and Howard J. Murray, Jr.

ABSTRACT: An arrangement for increasing the reliability of an electronic circuit employing individual Zener diodes, especially where such circuit is in a location difficult of access. Failure of one Zener diode in such an environment frequently results in long delays and great expense in locating the malfunction and making the repair. The present concept employs a plurality of Zener diodes in a network consisting of both series and parallel groupings, so that shorting of any one element changes the electrical characteristics of the overall network by only a negligible amount.

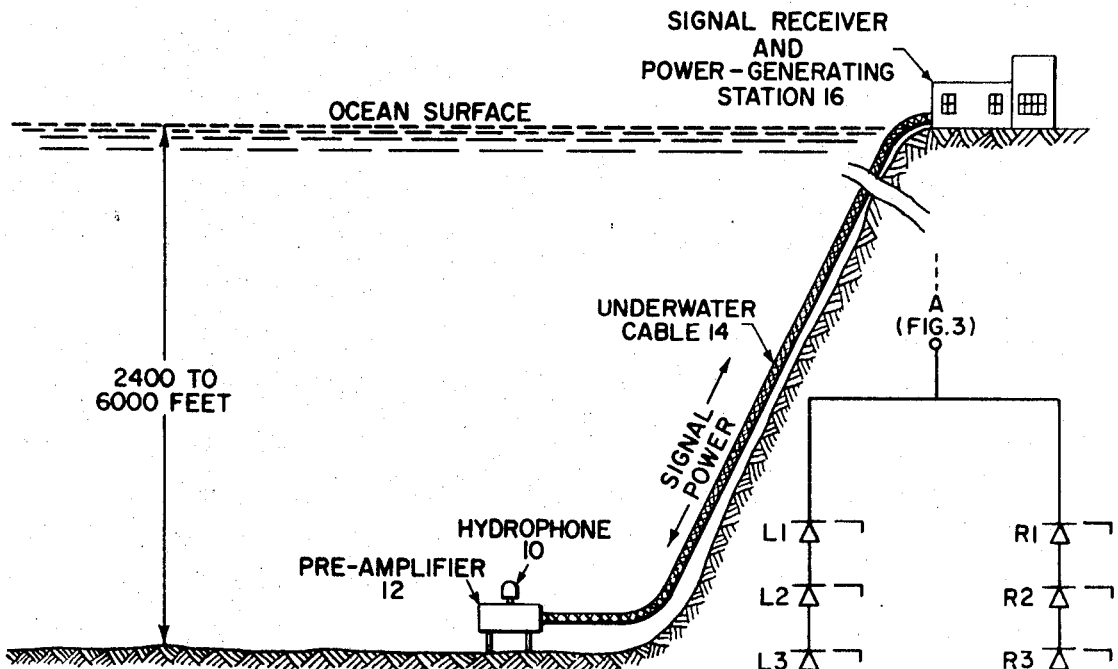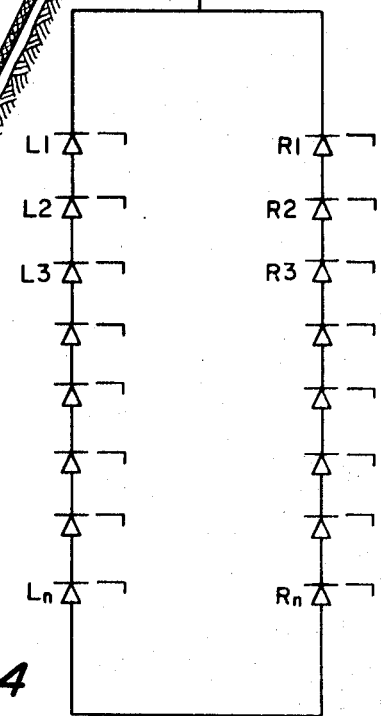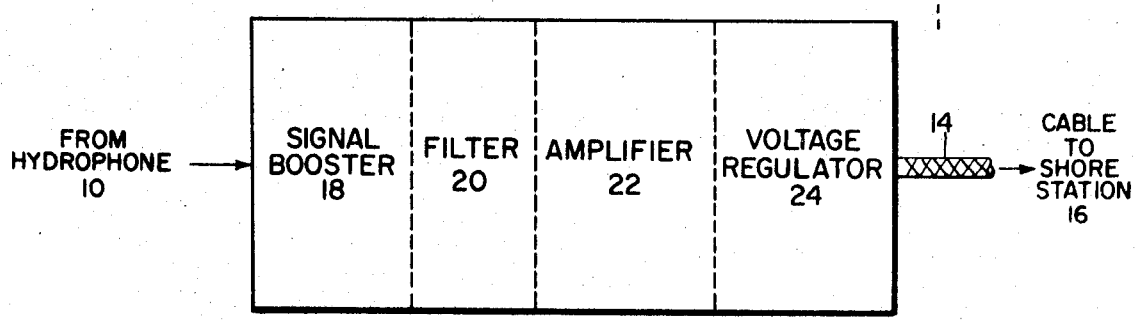

3,601,632

MEANS FOR INCREASING THE RELIABILITY OF ELECTRONIC CIRCUITS INCORPORATING ZENER DIODES

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

Zener diodes in general possess adequate statistical reliability, but if the zener junction should fail (usually in the shorted mode) then any other electronic component which depends upon the presence of the zener voltage becomes inoperative. In the less likely event of an open circuit, the zener clamping action is lost, and serious damage to one or more of the remaining system components may occur.

Although the results of such malfunctioning are harmful enough in normal usage, the problem assumes serious proportions when a circuit incorporating the Zener diode is in a location difficult of access. An example of such an application is Deep Ocean Instrumentation, where retrieval of the equipment is either impractical or inordinately expensive. In such cases, statistical reliability alone is insufficient.

In one system now in operation, an underwater object-tracking system includes a number of bottom-mounted hydrophones and a preamplifier positioned at depths of 2400 to 6000 feet. Signals picked up by the hydrophones are amplified and transmitted over an underwater cable to processing equipment on shore.

A Zener diode forms part of this preamplifier and functions to provide short term stability and distortion-free output by clamping the preamplifier DC voltage at the Zener voltage. Failure of this component in the past has necessitated the expenditure of many man-hours in retrieving the preamplifier from the ocean depths and effecting its subsequent replacement.

SUMMARY OF THE INVENTION

The present invention increases the reliability of an electronic network of the type described by providing two or more parallel current paths each containing a plurality of Zener diode junctions. The result is an inherently redundant, fail-safe construction in which breakdown of any single element has only minimal effect on the voltage-regulating action of the network as a whole.

OBJECTS OF THE INVENTION

One object of the present invention, therefore, is to improve the reliability and operating life of an electronic network incorporating a Zener diode as one component thereof.

Another object of the invention is to improve the reliability of an electronic voltage-regulating network providing a plurality of parallel current paths each made up of a number of Zener diodes connected in series relationship.

A further object of the invention is to add redundancy and fail safe operation to a voltage regulating and/or clamping network while at the same time extending the normal operating life thereof.

Other objects, advantages, and novel features of the invention will become apparent from the following detailed description of the invention when considered in conjunction with the accompanying drawings.

BRIEF DESCRIPTION OF THE DRAWINGS

FIG. 1 is a schematic illustration of one signal detection and transmission network in which the present invention finds particular application;

FIG. 2 is a more detailed showing of one of the components of the network of FIG. 1;

FIG. 4 is a schematic electrical diagram of one form of Zener diode voltage-regulating arrangement designed in accordance with the principles of the present invention, and intended for incorporation into the assembly of FIG. 3 to replace one of the elements thereof.

DESCRIPTION OF THE PREFERRED EMBODIMENT

Figure 3:
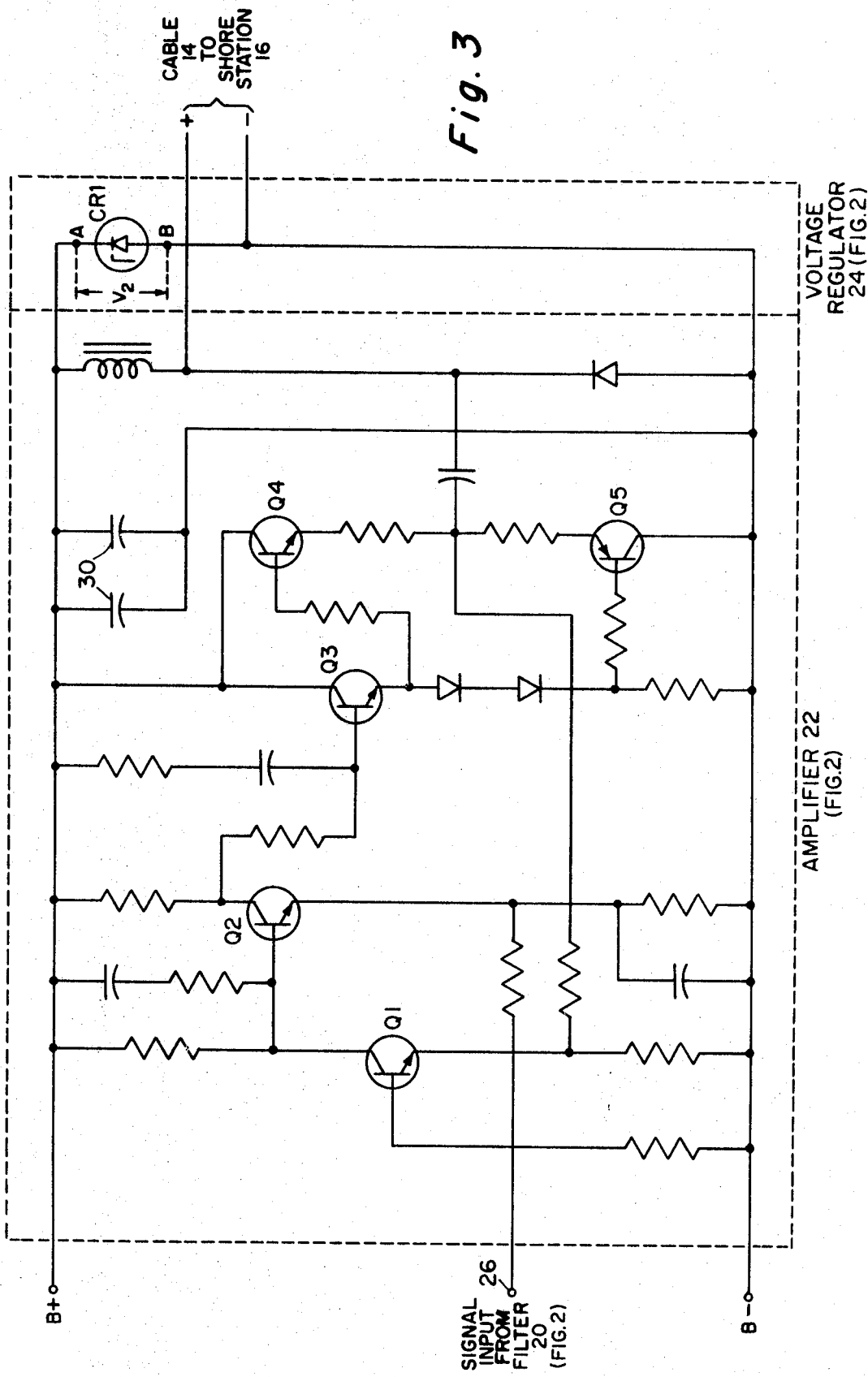
FIG. 3 is a schematic electrical diagram of the amplifier and voltage-regulator portions of FIG. 2.

Although the particular Zener diode arrangement of the present invention is capable of utilization in many different types of electronic circuits, it is especially useful in relatively inaccessible locations where any malfunction usually results in extended delays before repair or replacement can be effected. Consequently, the invention will be described in connection with apparatus forming part of an underwater object-tracking system, where the electronic equipment of which the invention network forms a part may be located at a depth of between 2400 and 6000 feet in the ocean. Under such circumstances, failure of any part of the circuitry obviously necessitates the expenditure of considerable time and expense in retrieving the apparatus and making the repair or replacement. Any expedient which reduces the possibility of a malfunction is therefore greatly to be desired.

Referring now to FIG. 1 of the drawings, there is shown somewhat schematically a portion of an underwater tracking system in which the present invention may be incorporated. Although the complete tracking system is made up of an array of similar spaced-apart hydrophones, only one such element is illustrated in FIG. 1 and identified by the reference numeral 10. This hydrophone in conventional fashion picks up acoustic pulses emanating from a moving object (not shown) and translates these acoustic pulses into electrical signals which are supplied to a preamplifier 12 located in the immediate vicinity of the hydrophone.

A two-way cable 14 connects the preamplifier 12 with a shore-based signal receiver and power-generating station 16. The latter functions both to receive and process electrical signals representative of the acoustic pulses picked up by the hydrophone 10, and also to provide power for operation of the preamplifier 12. Since this operating power for the preamplifier is in the form of a constant DC voltage, and since the data signals are of varying amplitude, there is no discernible interference therebetween even though both are concurrently transmitted over the cable 14. It is, however, important that the DC power available for operation of the preamplifier 12 be always stabilized at a constant level, and it is with this feature of the system that the present invention is concerned.

FIG. 2 illustrates in schematic fashion one preferred design for the preamplifier 12 of FIG. 1. In sequence, the electrical signals from hydrophone 10 pass through a conventional booster section 18, a standard filter 20, and are amplified by a unit 22 before being transmitted to station 16 over cable 14. Operating voltage supplied to amplifier 22 from station 16 over cable 14 is regulated by a unit 24.

FIG. 3 shows the details of amplifier 22, and also the details of voltage regulator 24 as they appear prior to the incorporation of the present invention therein. Signals appearing at the input terminal 26 and representing the output of filter 20 are applied to a transistor amplifier Q1 which inverts the input wave, the latter then passing through a second transistor amplifier Q2. A driver amplifier Q3 supplies the signal from Q2 to a further pair of transistors Q4 and Q5 operating as a push-pull amplifier to produce at a common output terminal 28 an amplified AC signal for transmission over the cable 14 to shore station 16.

DC energy from station 16 is received by amplifier 22 and appears across condensers 30. This voltage is stabilized by a Zener diode CR1, the latter being connected in parallel relationship with condensers 30 as illustrated in the drawing.

The shore station 16 is designed to supply a constant current (for example, 130 ma.) to the preamplifier 12 over cable 14. The preamplifier voltage is clamped at a value determined by the voltage $V_z$ of the Zener diode CR1 of FIG. 3, this voltage appearing between points A and B.

Inasmuch as this 130 ma. current is essentially constant, only very low IR fluctuations occur in the cable 14. However, the presence of the Zener diode CR1 provides short term stability and is important in ensuring distortion-free operation of the preamplifier 12. If this component fails, usually in the shorted mode, any electronic components which depend upon the presence of the voltage $V_z$ become inoperative. Likewise, if the diode becomes open circuited, its clamping action is lost, and other components may be damaged or rendered inoperative.

The present invention is directed to materially reducing the possibility of a malfunction in electrical networks of the type herein described. A preferred embodiment of the concept is shown in FIG. 4 of the drawings, and makes use of the principle of redundancy to provide a multijunction Zener of essentially fail-safe design.

In the arrangement illustrated, two parallel current paths or legs are established between points A and B (corresponding to points A and B in FIG. 3). Each leg contains an equal number of Zener diode junctions, L1–L$n$ and R1–R$n$, respectively, the number of junctions depending of course on the desired voltage drop between A and B. The characteristic Zener voltage $V_{z1}$ of each diode junction will necessarily depend upon the particular application for which the assembly is designed—for example, $V_{z1}$ may equal 4.5 volts for each diode junction. In such case, if an overall voltage from A to B of 45 volts is desired, then $n=10$ and 10 diode junctions are employed. It should be noted that exact matching of the two legs of FIG. 4 is not necessary, since the leg with the lowest overall voltage will be "on" while the other leg is "off."

In the event of failure of any particular diode in the shorted mode, the overall voltage from A to B will drop by 4.5 volts, or 10 percent of the total. Similar failure of two diodes will drop the overall voltage by 20 percent. If a diode open circuits, the leg in which that particular diode junction is located becomes inoperative, and the other parallel path takes over, L or R as the case may be. It should be noted that the preamplifier 12 (as well as any other circuit into which the invention arrangement is incorporated) is capable of operating with a loss in voltage of one, two or even three incremental junction voltages.

Although the invention principle as exemplified by the showing of FIG. 4 may be incorporated in different physical embodiments, it may be desirable in some cases to assembly all of the diode junctions on one heat sink in the manner of an IC (integrated circuit). It is now known that a plurality of multijunction Zeners can be formed as an IC and the entire two-terminal (A and B) device encapsulated in a hermetically sealed package. Such a construction allows for dissipation of heat energy by several junctions instead of one (as at present) and hence the thermal degradation of the solid-state junction material is reduced with a concomitant increase in electronic life expectancy.

Obviously, even greater redundancy is achieved by adding other legs in parallel with the two illustrated in FIG. 4. Normally, however, this expedient is unnecessary unless the apparatus of which it forms a part is required to operate for prolonged periods of time without attention, or where servicing is otherwise impracticable.

I claim:

1. In an electrical network situated in a location difficult of ready access and normally dependent for its proper functioning on the voltage-regulating properties of a Zener diode which is subject to malfunction thereby exposing other components of the network to damage by virtue of unregulated potential excursions, the improvement which comprises:

apparatus for increasing the operating life expectancy of said network, said apparatus including:

a plurality of Zener diodes arranged in at least two parallel paths both of which interconnect the potential points across which voltage regulation is desired, each of said paths containing at least two Zener diodes arranged in cascade, all of said diodes having essentially equal voltage drops thereacross, whereby the plurality of diodes in each path provide effective redundancy against a malfunction of any one diode in a shorted mode, and whereby the plurality of parallel paths provide effective redundancy against a malfunction of any diode in an open circuited mode, the number of diodes in each of said parallel paths being selected so that the overall voltage variation in each path occasioned by failure in a shorted mode of any one diode in that particular path does not exceed an amount which can be tolerated by other components of said network without damage thereto and does not exceed an amount which would result from the failure in a shorted mode of any other diode in that path.